US010805325B2

(12) United States Patent
Shulman et al.

(10) Patent No.: US 10,805,325 B2
(45) Date of Patent: Oct. 13, 2020

(54) TECHNIQUES FOR DETECTING ENTERPRISE INTRUSIONS UTILIZING ACTIVE TOKENS

(71) Applicant: Imperva, Inc., Redwood City, CA (US)

(72) Inventors: Amichai Shulman, Tel Aviv (IL); Sagie Dulce, Hod HaSharon (IL)

(73) Assignee: Imperva, Inc., San Mateo, CA (US)

( * ) Notice: Subject to any disclaimer, the term of this patent is extended or adjusted under 35 U.S.C. 154(b) by 242 days.

(21) Appl. No.: 15/672,055

(22) Filed: Aug. 8, 2017

(65) Prior Publication Data

US 2018/0048665 A1 Feb. 15, 2018

Related U.S. Application Data

(60) Provisional application No. 62/372,780, filed on Aug. 9, 2016.

(51) Int. Cl.
*H04L 29/06* (2006.01)
(52) U.S. Cl.
CPC ........ *H04L 63/1425* (2013.01); *H04L 63/083* (2013.01); *H04L 63/102* (2013.01); *Y02D 30/00* (2018.01)
(58) Field of Classification Search
None
See application file for complete search history.

(56) References Cited

U.S. PATENT DOCUMENTS

| 2003/0145224 | A1* | 7/2003 | Bailey | H04L 63/083 726/5 |
| 2007/0101020 | A1* | 5/2007 | Lin | H04L 1/1607 709/238 |
| 2009/0222920 | A1* | 9/2009 | Chow | G06F 21/566 726/23 |
| 2010/0024034 | A1* | 1/2010 | Cohen | G06F 21/552 726/24 |
| 2012/0303808 | A1* | 11/2012 | Xie | H04L 63/0236 709/225 |
| 2015/0013006 | A1* | 1/2015 | Shulman | H04L 63/1416 726/23 |
| 2015/0381655 | A1* | 12/2015 | Zeltser | H04L 63/1491 726/23 |
| 2017/0093910 | A1* | 3/2017 | Gukal | H04L 63/1416 |

OTHER PUBLICATIONS

Asif, Intrusion Detection System using Honey Token based Encryption Pointers to Mitigate Cyber Threats for Critical Infrastructure Networks, 2014 IEEE International Conference on Systems, Man, and Cybernetics, pp. 1-6. (Year: 2014).*

(Continued)

*Primary Examiner* — Benjamin E Lanier
(74) *Attorney, Agent, or Firm* — Nicholson De Vos Webster & Elliott LLP

(57) ABSTRACT

A Token Transmission Server transmits active tokens within an enterprise network. The active tokens include either active data tokens or active request tokens, and are fraudulent from the perspective of the enterprise. A Token Monitoring Server monitors network traffic within the enterprise network to detect the presence of network traffic being originated by an enterprise device based upon the active tokens, and generates an alert indicating that the enterprise device is likely compromised.

30 Claims, 6 Drawing Sheets

(56) References Cited

OTHER PUBLICATIONS

Gustafson, "Leveraging the Crowds to Disrupt Phising", 2013 IEEE Conference on Communications and Network Security, pp. 1-9. (Year: 2013).*

Husak, "PhiGARo: Automatic Phishing Detection and Incident Response Framework", 2014 9th International Conference on Availability, Reliability, and Security, pp. 1-8. (Year: 2014).*

Storey, "Catching flies with honey tokens", Network Security, pp. 1-4. (Year: 2009).*

* cited by examiner

TECHNIQUES FOR DETECTING ENTERPRISE INTRUSIONS UTILIZING ACTIVE TOKENS

CROSS-REFERENCE TO RELATED APPLICATIONS

This application claims the benefit of U.S. Provisional Application No. 62/372,780, filed Aug. 9, 2016, which is hereby incorporated by reference.

FIELD

Embodiments of the invention relate to the field of computer network security; and more specifically, to techniques for detecting enterprise intrusions utilizing active tokens.

BACKGROUND

In the field of computer security, the term "honeypot" is used to refer to a trap set to detect, deflect, or counteract attempts at an unauthorized use or malicious use of information systems. Generally, a honeypot is a decoy server or end station that appears to contain information or a resource of value to attackers, but in actuality may be isolated and/or monitored and not include legitimate information or resources. Honeypots allow system operators to learn how attackers probe and attempt to gain access to end stations by maintaining a record of the attacker's activities. Further, honeypots may also gather evidence to be used to assist in the apprehension or prosecution of attackers.

Thus, honeypots are security resources that are intended to be probed, attacked, and compromised to allow for information about the attacker and the techniques of the attacker to be discovered. Production honeypots, as compared to research honeypots that seek to research threats being used, are typically placed within a production network (i.e., a network actively used for other purposes unrelated to threat/attack detection alone) along with other production computing resources used by authorized users of the production network to improve the security of the production network.

Honeypots can be classified as either high-interaction or low-interaction. High-interaction honeypots may utilize actual computing resources and/or software (e.g., a fully-installed and configured Unix system) to interact with potential attackers to provide a detailed and complete view of an attack, whereas low-interaction honeypots typically emulate one or more potentially vulnerable services or software (e.g., a standalone FTP server, or a standard Unix server with several typically attacked services, such as Finger, Telnet, and/or File Transfer Protocol (FTP)), and thus cannot typically become infected or compromised by an attack.

Some security approaches have turned to the use of "honey tokens" to attempt to detect intrusions. The term "honey token" refers to honeypots that are not servers or server end stations. Instead, honey tokens can be pieces of information placed in server data repositories that are easy to detect when used/accessed, and are rarely (if ever) used/accessed by an authorized user. For example, a honey token could be a user account configured for a server or server end station that is not assigned to or used by any authorized user, or a database entry that would typically only be selected by a malicious query. Accordingly, a compromise of the server having placed thereon a honey token can be identified when, for example, the honey token is detected outside of the server's data repository, or when an access to the honey token within the server data repository occurs. Thus, upon an attempted use of the user account honey token (e.g., an attempt to log on to a server) or an attempted access of the database entry including a honey token, an alarm can be issued to notify interested parties about the occurrence of the compromise.

However, successfully deploying and utilizing honeypots and honey tokens in enterprises has proven extremely challenging. For example, to implement honeypots, additional computing resources (e.g., server end stations, special-purpose software, etc.) need to be acquired, configured, deployed, managed, monitored, etc., by the implementing enterprises. In many cases, these enterprises often lose the desire or ability to maintain the operation of these systems over time.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
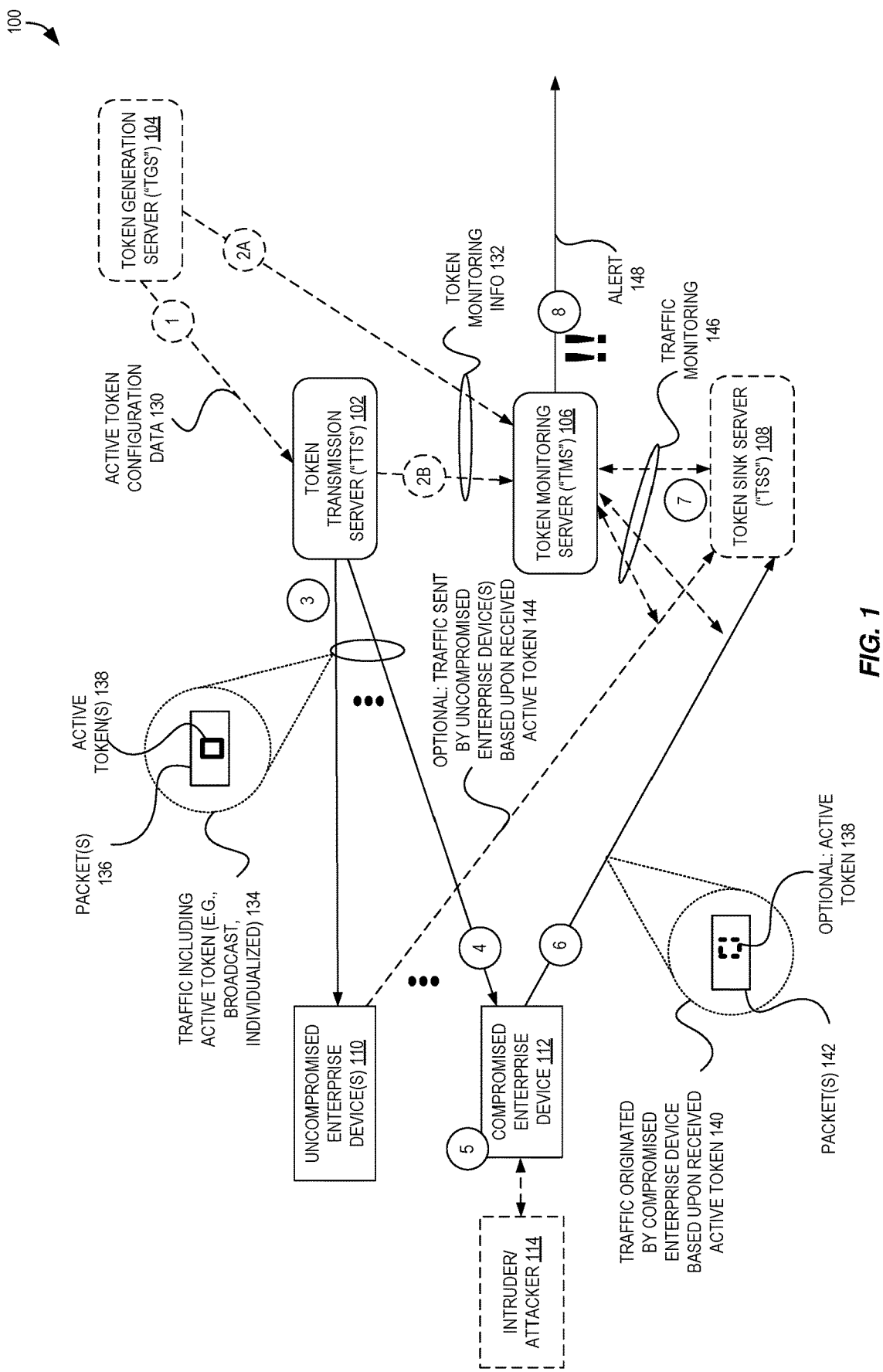
FIG. 1 is a block diagram illustrating an exemplary system 100 for detecting enterprise intrusions using active tokens according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read only memory (ROM), flash memory devices, phase-change memory) and transitory computer-readable communication media (e.g., electrical, optical, acoustical or other form of propagated signals, such as carrier waves, infrared signals, digital signals, etc.). In addition, such electronic devices include hardware, such as a set of one or more processors coupled to one or more other components, e.g., one or more non-transitory machine-readable storage media to store code and/or data, and a set of one or more wired and/or wireless network interfaces allowing the electronic device to transmit data to and receive data from other electronic devices, typically across one or more networks (e.g., Local Area Networks (LANs), the Internet). The coupling of the set of processors and other components is typically implemented through one or more interconnects within the electronic device (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

Deception is a well-known practice in the field of network intrusion detection. As described above, there are a number of deception techniques commonly utilized to attempt to detect network intruders, such as honey pots and honey tokens. These techniques rely on placing data on existing servers and end stations, or by placing servers in the network and waiting for an intruder to access them.

As used herein, the term "token" may be used to refer to a piece of information that appears to be of use for a computing resource. For example, a token can be a public or private network address, hostname, path, etc., that appears to identify a location of a resource that could be used. As additional examples, a token can be a username, password, key, certificate, challenge response, etc., that appears to be useful for gaining access to a resource (e.g., by allowing a user to perform an authentication process, etc.). As additional examples, a token can be a protocol identifier (e.g., "FTP" for File Transfer Protocol), a software/product name and/or version/revision/etc. (e.g., "MySQL 5.6"), or other piece of information identifying how to access a resource.

Many types of tokens can be utilized for various network security purposes. For example, the term "honey token" can refer to a piece of information placed in a server data repository that is relatively easy to detect when used or accessed, and is rarely (if ever) used or accessed by an authorized user. For example, a honey token could be a user account identifier (e.g., a username) of an account configured for a server or server end station that is not assigned to or used by any authorized user, a database entry that would typically only be selected by a malicious query, etc.

Additionally, a "reverse" honey token, unlike a regular or "traditional" honey token, is not placed for discovery within a server or server end station. Instead, reverse honey tokens can be placed in client end stations (e.g., into one or more user electronic devices within an enterprise utilized by employees, for example) at locations such that the reverse honey tokens are not easily found or utilized by the authorized end users of those client end stations. Reverse honey tokens can have an apparent use at a server that is typically not hosted by or co-located with the client end station where they are placed.

Further, a "noisy" token is one that is placed in a particular location (or as a particular type of file) within a device such that it is "activated" upon non-malicious operations of the device and also likely to be used by an attacker/intruder. In particular, noisy tokens are designed with the intention to be deployed on assets in such a way that local operations on these assets generate network traffic (e.g., network connections). For example, certain local operations on noisy tokens may generate traffic to a configured target server using a target protocol and port. This traffic can then be detected/read by a sensor and translated back to the local operations that were performed on the asset. For example, a noisy token could be "activated" (i.e., generate network traffic) on a regular or semi-regular basis: upon a user logging in to a machine, upon an anti-virus scan, after each defined interval amount of time or at particular times of day, etc. Accordingly, from the resulting activity generated by these noisy tokens, patterns from the network noise can be identified that allow the system to identify/detect deviations from these patterns that likely result from the activity of an attacker/intruder, and/or profile assets and other domain accounts inside the network.

However, in addition to searching for seemingly-useful information on end stations themselves, sophisticated network intruders have also been observed as using a variety of tools to monitor an enterprise's Local Area Network (LAN) in order to extract useful information. For example, some intruders may perform a phase of network reconnaissance by monitoring network communications in a "passive" way, where attackers can "quietly" operate both effectively and without generating a significant detectable footprint within the network. At a later "active" phase of an attack, then, intruders may later interact with components in the compromised network based upon the passively-learned intelligence. Additionally, in the active phase an attacker may even respond to some network messages in order to devise Man-In-The-Middle (MITM) attacks, in which traffic from a client or server is subverted to flow through a device (at least in part) controlled by the intruder, allowing the intruder to effectively read or perhaps even modify the content of the communications.

Notably, the existing token placement techniques discussed above are not able to detect these types of attacks because of the attackers' focus upon observing and/or modifying network traffic, which thus typically do not involve exploring client or server end stations for information.

Accordingly, embodiments disclosed herein include methods, non-transitory computer readable storage media, systems, and apparatuses for detecting enterprise intrusions using "active tokens." Embodiments provide a new deception-based technique that include actively sending misleading information over a network in order to detect intruders, which can occur at an early stage of their operations within an enterprise network.

According to some embodiments, network packets are transmitted within a network that contain purposefully-selected fake information in a format that is known to often be monitored by intruders. Embodiments can monitor further network traffic to assess whether the fake information was used to attempt to and/or access assets within the network. Accordingly, embodiments can detect an intruder that, within the network, has picked up the fake information and attempted to use it.

According to some embodiments, packets carrying network requests can be distributed within a network that are known as potentially being intercepted by an intruder. In some embodiments, these network requests will not be responded to by any legitimate entity within the enterprise network. Thus, network activity can be monitored to determine whether there has been any reply sent responsive to these network requests, which can include determining whether such a reply represents an intruder attempting a MITM attack. Moreover, in some embodiments, a legitimate entity may respond to the network requests, and network activity can be monitored to determine whether there has been any reply sent responsive to these network requests, and whether the reply is from a legitimate or illegitimate source.

Thus, embodiments can identify intruders that monitor network traffic (and attempt to exploit that traffic) even if the intruders are not actively exploring the contents of end stations or other devices within the network. In response, in some embodiments alerts can be generated, which can include one or more of notifying network administrators, increasing logging within the network involving a compromised device or other devices, increasing security within the network involving a compromised device or other devices, etc.

As utilized herein, the term "active token" may be used to refer to an "active data token" or an "active request token." As introduced earlier, an active data token may comprise false or "fake" information that may appear as legitimate to an attacker/intruder and is sent within one or more packets of network traffic. The fake information, depending upon the particular type of active data token, may include one or more values of the packet(s), and may include packet header values (e.g., a source Internet Protocol (IP) address) and/or packet payload data. Additionally, as introduced above, an active request token can include a request according to a particular protocol carried by one or more packets. An active request token may or may not include "false" information, but the active request token itself can be referred to as being "false" as it pertains to a request that is illegitimate within the context of the enterprise network. Further detail regarding these types of active tokens will be described in additional detail below with regard to various embodiments.

FIG. 1 is a block diagram illustrating an exemplary system 100 for detecting enterprise intrusions using active tokens according to some embodiments. The system 100 includes a Token Transmission Server ("TTS") 102, a Token Monitoring Server ("TMS") 106, and optionally a Token Sink Server ("TSS") 108 and/or Token Generation Server ("TGS") 104.

In some embodiments, at circle '1' the TGS 104, where utilized, can provide active token configuration data 130 to the TTS 102, which can cause the TTS 102 to be enabled to transmit active tokens within an enterprise network. The TGS 104, in some embodiments, can instruct the TTS 102 to transmit certain types of active tokens and may be configured with logic to generate particular active tokens. Accordingly, in some embodiments the active token configuration data 130 may include one or more commands to the TTS 102 to cause it to send the active tokens, and in some embodiments the active token configuration data 130 may include actual data for active tokens. The TGS 104 may, in some embodiments, transmit at circle '2A' token monitoring information 132 to the TMS 106.

The token monitoring information 132 enables to TMS 106 to detect traffic that is transmitted by a compromised end station due to an active token transmitted by the TTS 102. For example, in some embodiments the token monitoring information 132 identifies particular data within network traffic that the TMS 106 is to watch for—e.g., one or more values (header values, payload values, etc.) within one or more packets—that, if observed, is highly likely to be from a compromised enterprise device 112. In some embodiments, the token monitoring information 132 need not include specific values, but rather indicate one or more particular types of messages which, if observed, is highly likely to be from a compromised enterprise device 112.

In some embodiments, the TTS 102 itself may send at circle '2B' token monitoring information 132 to the TMS 106. This can occur after the TTS 102 receives the active token configuration data 130 from the TGS 104.

At circle '3', the TTS 102 can transmit traffic 134 including one or more active tokens 138—i.e., one or more packets 136 carrying one or more active tokens 138—within an enterprise network. The one or more active tokens 138 can include active data tokens, active request tokens, or some of each.

The packets 136, in some embodiments, can be sent using protocols that are commonly monitored by intruders who look for information about the network structure and/or the assets in the network.

In some embodiments, traffic 134 may include header fields and possibly a payload having data in accordance with an application layer protocol. The term "application layer" generally refers to an abstraction layer specifying the shared protocols and/or interface methods used by hosts in a communications network. This application layer abstraction is utilized in both of the standard models of computer networking: the Internet Protocol Suite (i.e., Transmission Control Protocol/Internet Protocol (TCP/IP)) and the Open Systems Interconnection (OSI) model. A few examples of application layer protocols include, but are not limited to, Hypertext Transfer Protocol (HTTP) for web application communication, Telnet for remote login to hosts, DNS for networking support, File Transfer Protocol (FTP) or Network File Systems (NFS) or Common Internet File System (CIFS) or Server Message Block (SMB) for file storage/retrieval, Internet Message Access Protocol (IMAP) and Post Office Protocol (POP) for receiving email, Simple Mail Transfer Protocol (SMTP) for transmitting email, Internet Relay Chat (IRC) for real-time messaging, Session Initiation Protocol (SIP) for voice and video calling, Network News Transfer Protocol (NNTP) for transporting news articles, Extensible Messaging and Presence Protocol (XMPP) for messaging, Network File System (NFS) for the remote access of files, Simple Network Management Protocol (SNMP) or Common Management Information Services and Protocol over TCP (CMOT) for remote host management, etc.

Accordingly, the payload of the packets 136 can include commands or functions associated with one or more application layer protocols, which can include one or more active tokens. For example, the payload could be an HTTP request message including a Uniform Resource Locator (URL)/Uniform Resource Identifier (URI) active token (or directory or filename token within a URL/URI) or a name/value pair (as part of a query string) token. As another example, the payload 125 could be a database query or command (e.g., a Structured Query Language) including a table name, database name, field name, etc., that is a token. As yet another example, the payload 125 could be a CIFS message (e.g., a request to open or read a file) including a filename token.

Additionally or alternatively, the header fields of the packet(s) 136 may also carry one or more of the active token(s) 138. For example, a source IP address or destination IP address (of an IP header field) can serve as an active token, such as when that IP address is not utilized by a legitimate server/resource within the enterprise. Further, other packet header values such as Media Access Control (MAC) addresses, port numbers/identifiers, etc., can similarly serve as one or more of the active token(s) 138.

Accordingly, many different token possibilities can be implemented by those of skill in the art, and the selection of these possibilities and/or associated protocols can be customized to a particular deployment environment (e.g., an enterprise network) based upon what types of enterprise resources might be expected to be utilized in that environment, i.e., what types may believably appear to be authentic to an attacker when discovered in a particular context.

Thus, the TMS 106 can be enabled, via token monitoring information 132, to watch for the use of these active token(s) 138 within network traffic.

In various embodiments, the traffic 134 carrying the active token(s) 138 can be sent by the TTS 102 using one or more of a variety of distribution techniques. For example, in some embodiments the traffic 134 can be sent using a broadcast-style mechanism such that the traffic 136 is partially or completely flooded throughout the network. By sending the traffic 134 throughout the network, this technique can increase the odds that a compromised enterprise device 112 would observe the active token 138 and thus, increase the odds that a compromised enterprise device 112 may attempt to utilize the active tokens 138 and thus be detected by the TMS 106. Additionally, in some embodiments the traffic 134 can be sent using a unicast mechanism (i.e., direct addressing) to one or more endpoints within the network. Further, in some embodiments a "modified unicast" mechanism can be utilized to effectively simulate broadcast and ensure wide distribution of the active tokens 138, even when the traffic 134 is not suited for traditional broadcast-type transmission. Additional detail regarding some distribution techniques will be presented later herein with regard to FIG. 6.

In some embodiments, the active token(s) 138 may be transmitted by the TTS 102 just one time, but in some embodiments the active token(s) 138 can be transmitted more than one time. For example, in some embodiments one or more of the active token(s) 138 are transmitted periodically (e.g., at certain intervals of time), according to a schedule, etc., such that the active token(s) 138 appear at a frequency that makes their appearance credible, as an intruder may not be convinced that an asset/resource actually exists unless traffic 134 indicating the existence of that asset/resource are repeated over time.

Thereafter, due to the transmission by the TTS 102 of the traffic 134 including one or more active tokens (at circle '3'), the traffic 134 will arrive at one or more uncompromised enterprise devices 110. In some embodiments, one or more of the one or more uncompromised enterprise devices 110 may respond to the traffic 134 with traffic 144. For example, in some embodiments where the active tokens 138 are active request tokens, one or more of the uncompromised enterprise devices 110 may respond with a response message carried by traffic 144. Further detail regarding such traffic 144 that may be sent by uncompromised enterprise devices based upon their having received the active token(s) will be presented later herein with regard to FIG. 3.

Additionally due to the transmission by the TTS 102 of the traffic 134 including one or more active tokens (at circle '3'), the traffic 134 will also arrive at a compromised enterprise device 112 at circle '4'. The compromised enterprise device 112 can include a variety of types of enterprise devices, including but not limited to server end stations, client end stations, network devices, etc.

The compromised enterprise device 112 may be directly or indirectly under control of an "attacker" or "intruder" 114. For example, the intruder 114 may have utilized a client end station that is physically located within the enterprise (e.g., within a same building or campus as the compromised enterprise device 112) or that is separate from the enterprise (and thus, separate from the enterprise network in which the compromised enterprise device 112 operates). When the intruder 114 (and corresponding client end station) is remote from the enterprise, the intruder 114 may connect to the enterprise network via a Virtual Private Network (VPN) connection or other type of connection by connecting (e.g., across the Internet) to a remote access gateway that is within, or otherwise provides access to, the enterprise network.

In some embodiments, the intruder 114 may or may not actively have a connection into the enterprise network at the time of certain or all of the illustrated operations. For example, the intruder 114 may benefit from malware being installed an enterprise device, causing it to be compromised (and thus, the compromised enterprise device 112). This malware may operate independently and/or under the control of the intruder 114.

Thus, the compromised enterprise device 112 (e.g., by commands of the intruder 114, through execution of the malware, etc.) is configured to monitor network traffic of the enterprise to assist the intruder 114 with learning about the network and the resources/assets in the network.

Accordingly, at circle '5', the compromised enterprise device 112 will detect the active tokens 138 of the traffic 134. Due to the specific construction and deployment of active tokens 138, the intruder 114 (or malware acting on behalf of the intruder, etc.) will take note of the "fake"

information of the active token(s) 138, and at some point in time will transmit traffic 140 based upon the received active token(s) at circle '6'. This transmission may occur due to a command of an intruder/attacker 114, but in some cases malware executed by the compromised enterprise device 112 may even directly cause the traffic 140 to be originated within the enterprise network without any prior knowledge on the part of the attacker 114. The traffic 140 may be sent to a destination that the intruder 114 believes may be a legitimate enterprise resource due at least in part to the active token(s) 138.

In some cases, this transmission of the traffic 140 may occur shortly after (e.g., fractions of a second, numerous seconds, minutes, etc.) the compromised enterprise device 112 receives the traffic 134 including the active token(s), as an intruder 114 may seek to immediately attempt to learn additional information about (or exploit/compromise) a potential targeted asset/resource that is associated with the "fake" active token information. However, in some circumstances this transmission of the traffic 140 may occur at a later point in time—e.g., later that day, in a subsequent day, week, etc.—during another phase of an attack or simply to attempt to conceal the nature of the intruder's presence in the network.

Depending upon the particular deployed token(s) 138, the traffic 140 originated by the compromised enterprise device 112 may or may not include the active token(s) 138. For example, if an active token 138 comprises a (fake) IP address of a non-existent server within the enterprise, the packets 142 may include that (fake) IP address server, such as within an IP header field (e.g., as a destination IP address of the packet(s) 142). In contrast, as another example, if an active token 138 comprises (fake) credentials for an apparent (but non-existent) file server, the traffic 140 sent by the compromised enterprise device 112 may simply include initial handshake-type messages (not involving the fake credentials) that simply seek to open a connection to the (non-existent) file server, etc.

At circle '7', the TMS 106 detects the existence of the traffic 140 originated by the compromised enterprise device via traffic monitoring 146 (e.g., utilizing rules/logic based upon token monitoring information 132), and based upon detecting that traffic, at circle '8' may generate an alert 148.

The TMS 106 can be configured to detect this traffic 140 in a variety of ways. In some embodiments, one or more Token Sink Servers ("TSS") 108 can be implemented to act as a recipient of such traffic 140 that will be originated by compromised enterprise devices 112 when seeking to exploit the active tokens 138. The TSS 108 can be implemented such that it will be the recipient of traffic 140 in a variety of ways, for example, by utilizing one or more IP addresses, MAC addresses, port numbers, etc., that are active tokens 138 or associated with the active tokens 138. For example, if an active token 138 comprises an IP address of an apparent (but not legitimate, from the perspective of the enterprise) database server, the TSS 108 can be assigned (or utilize) that IP address such traffic destined to that IP address (e.g., that the compromised enterprise device 112 originates) will be provided to the TSS 108.

The TSS 108 can be implemented as simple processes to essentially only receive network traffic, or can be more complex. For example, in some embodiments, one or more of the TSS 108 can be "commodity"-type servers that are provided by third parties, such as open source servers, proprietary servers, etc., and in some embodiments different ones of the TSS 108—of a same or different type—can be implemented from different sources (e.g., different providers/vendors). In some such embodiments, the TSS 108 can be easily acquired, updated, launched, managed, etc., using conventional server management tools known to those of skill in the art.

As indicated above, in various embodiments the TMS 106 can monitor 146 the traffic in a variety of ways. In some embodiments, the TSS 108 can be configured to send some or all of the received traffic to the TMS 106, thus providing visibility of the traffic to the TMS 106.

Further, in some embodiments the TMS 106 can be configured to monitor the TSS 108 either directly or indirectly. For example, the TMS 106 can be configured to indirectly monitor the TSS 108 by reading log files (or other metadata output by the TSS 108 as a result of processing traffic 140) created by the TSS 108. As another example, in some embodiments the TMS 106 can directly monitor the TSS 108 by, for example, having the TSS 108 report certain data to the TMS 106, such as some or all of its received traffic, etc.

Further, in some embodiments the TMS 106 may be deployed in such a manner as to have visibility into communications occurring between the compromised enterprise device 112 and the TSS 108. For example, the TMS 106 can be deployed at a security gateway (or coupled to a security gateway) located "in front" of the TSS 108, and thus will see the traffic 140 as it flows toward the TSS 108.

Regardless of how the TMS 106 gains visibility into the traffic 140, the TMS 106 can be configured to utilize rules/logic to detect an alert triggering event (e.g., the receipt of the traffic 140 originated by the compromised enterprise device based upon the active token).

In some embodiments, the alert 148 can be provided to a management server (not illustrated) of the enterprise, which could be a Security Information and Event Management (SIEM) server. Moreover, in some embodiments, data associated with the alert 148 generated by the TMS 106 can be viewed by an administrator using a specialized graphical user interface (GUI), and/or sent to designated administrators via email or other push communication channel.

In some embodiments, the alert 148 can result in any number of operations known to those of skill in the art, including but not limited to the sending of an electronic message (e.g., email, Short Message Service (SMS), instant message, etc.) or causing a particular enterprise user to be notified (e.g., via voice message, via a web or application interface, etc.), etc. Additional operations could include, for example, launching additional network security measures to attempt to protect the enterprise network(s) from the attacker 114, such as increasing an amount of logging or monitoring of some or all traffic/devices within the enterprise network, etc. Thus, in some embodiments, particular traffic or devices (e.g., compromised enterprise device 112) associated with or known to be currently/previously utilized by the intruder 114—such as a remote access gateway, client end station, server end station, etc.—can be more closely monitored. Further, additionally or alternatively, in some embodiments some or all traffic associated with the intruder 114 or devices associated with or known to be currently/previously utilized by the intruder 114 can further be blocked for a period of time or indefinitely. Moreover, additionally or alternatively, in some embodiments the additional network security measures can include increasing an amount of security or logging of legitimate enterprise resources such as internal enterprise servers, external enterprise servers, etc., in order to quickly protect the enterprise network based upon the discovery of the intruder 114.

Figure 2:
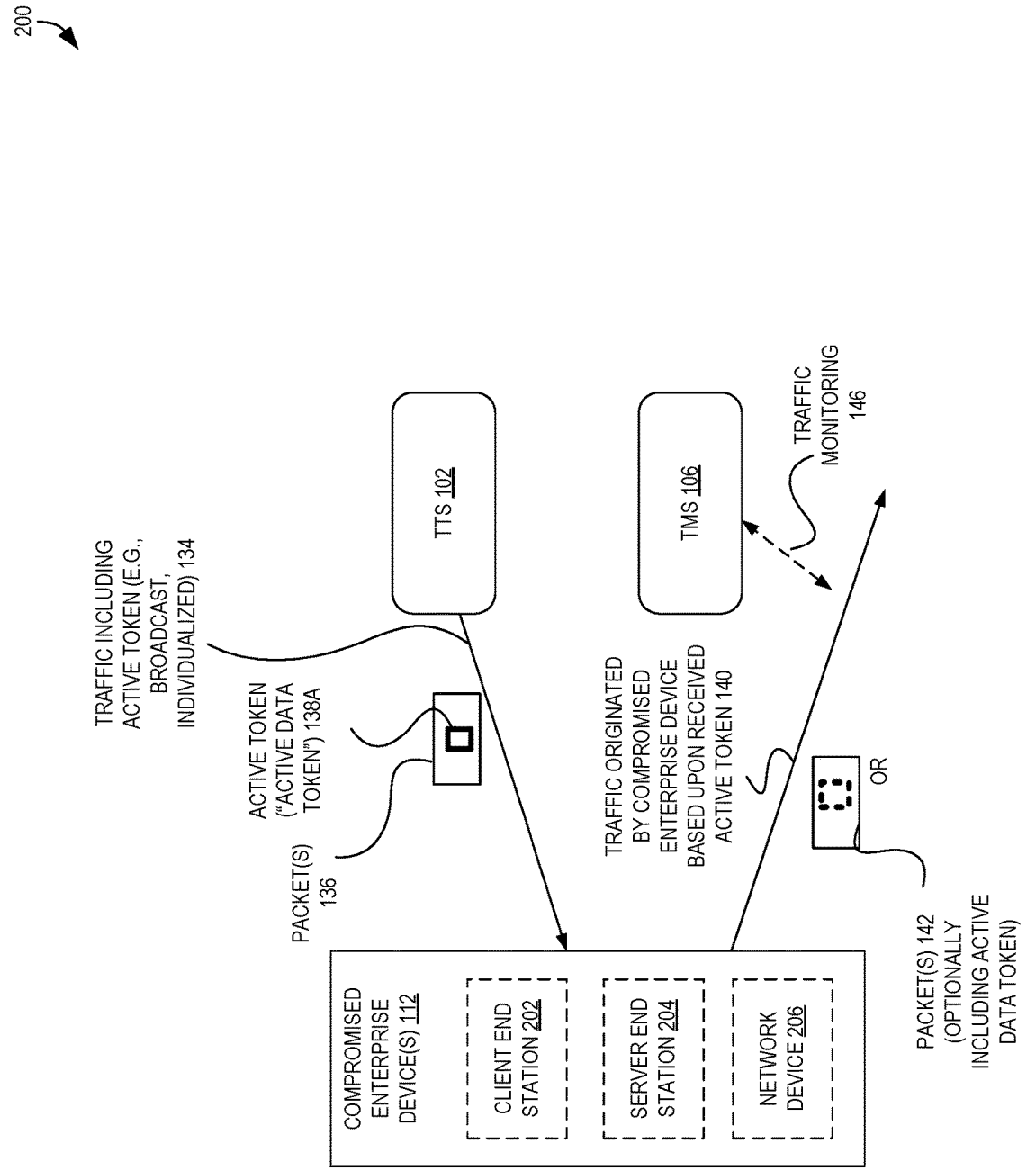
FIG. 2 is block diagram illustrating an active data token and traffic originated by a compromised enterprise device based upon the transmitted active data token according to some embodiments.

As discussed above, active tokens that are transmitted within an enterprise network can include active data tokens and/or active request tokens. For example, FIG. 2 is block diagram 200 illustrating an active data token 138A and traffic 140 originated by a compromised enterprise device 112 based upon the transmitted active data token according to some embodiments. As illustrated, a compromised enterprise device 112 can be, for example, a client end station 202, a server end station 204, a network device 206 such as a router or switch, etc.

Active data tokens, as indicated above, can comprise false or "fake" information that may appear as legitimate to an attacker/intruder. The fake information, depending upon the particular type of active data token, may include one or more values of the packet(s) carrying the active data tokens, and may include packet header values (e.g., a source Internet Protocol (IP) address) and/or packet payload data.

Thus, the packets 136 can include, as the active data token(s) 138A, "fake" information such as names of network assets/resources, information about the network addresses of assets/resources, information identifying or suggesting services that are supported by an asset/resource, available Transmission Control Protocol (TCP) and/or User Datagram Protocol (UDP) ports, access credentials, etc.

Active data tokens can be chosen for a particular enterprise network based upon what types of assets/resources/protocols/etc. are "believable" as existing within that enterprise network. Accordingly, there can be many types of active data tokens that can be crafted for particular environments. A few examples of active data tokens will be described next; however, it is to be understood that this listing is merely exemplary and thus, more, fewer, and/or different types of active data tokens can be utilized in different embodiments.

Some embodiments can utilize Server Message Block (SMB) Mailslot Announcement messages. The Mailslot protocol is part of the SMB protocol family, and is commonly used by components in some Microsoft® environments to perform simple inter-process communication. A Mailslot is a (temporary) RAM-based file to which records of data can be written to and read by several end stations on a same network (e.g., domain). Embodiments can thus generate Mailslot messages that announces services that do not exist within the enterprise network, and thus, these identified services function as active data tokens.

Some embodiments can utilize Simple Service Discovery Protocol (SSDP) "Notify" messages. SSDP is a protocol used by components to advertise services. Embodiments can generate SSDP notifications that declare fake services, i.e., make devices in the enterprise network aware of the existence of a specific host (e.g., identified by a name or IP address) listening on a specific port. Accordingly, this host information (e.g., hostname, IP address, etc.) can function as active data tokens.

Some embodiments can utilize Link Layer Discovery Protocol (LLDP) Advertisement messages. LLDP is a protocol used by components to advertise their identity, capabilities, and neighbors within the network. Embodiments can generate LLDP advertisement messages including one or more active data tokens, e.g., a fake MAC address and/or a fake management address (e.g., an IP address), etc. Moreover, one or more additional fields can be inserted in an LLDP message to carry active data tokens, such as a system name, system description (e.g., identifying a vulnerable operating system type), etc., to make the target seem more appealing.

Some embodiments can utilize Windows Internet Name Service (WINS) protocol announcements. WINS provides a distributed database for registering and querying dynamic mappings of NetBIOS names for computers and groups used on a network, and can map NetBIOS names to IP addresses. Accordingly, the WINS protocol is often used by components in a Microsoft® environment to announce their existence. Embodiments can thus generate messages announcing fake end-stations, fake servers, fake file shares, etc., as active data tokens.

Some embodiments can utilize Address Resolution Protocol (ARP) messages. The ARP protocol is used in networks to request a mapping of an IP address to a physical layer address (e.g., a MAC address). Embodiments can generate ARP requests including a fake IP address (as an active data token) that is not actually used in the network.

Some embodiments can utilize Domain Name Server (DNS) query messages. The DNS protocol is used in networks to request a mapping of a host name to an IP address. Embodiments can generate DNS requests including fake host names (as an active data token). In some embodiments, the TTS 102 can even be configured to generate DNS responses (e.g., after a period of time) indicating a fake IP address (as an active data token) corresponding to the fake host name.

Some embodiments can utilize CIFS connection setup messages. The CIFS protocol is often used by Microsoft® components for file sharing and also serves as the basis for other Microsoft® services. Embodiments can, for example, establish a CIFS connection to an end point and try to complete the authentication stage of the CIFS connection setup using fake credentials (e.g., a username and/or password) as an active data token.

Accordingly, after the transmission of one or more different types of active data tokens 138A, the compromised enterprise device 112 may attempt to exploit this fake information by transmitting traffic 140 comprising one or more packets 142. These packets 142 may carry a number of different types of messages based upon the type of active data token 138A (or apparent asset/resource associated with the type of active data token 138A). For example, the packets 142 may not be of the same protocol as the corresponding active data token 138A—e.g., the traffic 140 could be a port scan of a seemingly-existing IP address (that is "fake" and actually is the active data token). However, the packets 142 may potentially be of the same protocol as the corresponding active data token 138A—e.g., the traffic 140 could carry a CIFS message attempting to log in to a CIFS server using credentials when those credentials (and/or the network address/hostname of a CIFS server) were advertised as active data tokens also using the CIFS protocol.

In some embodiments, the traffic 134 carrying the active token(s) 138 can be specially crafted such that uncompromised enterprise devices 110 (e.g., server end stations, client end stations, network devices) will not utilize the "fake" active token(s) 138 information. For example, depending upon the type of packets, in some embodiments the packets can be carefully formatted (or transmitted) in a way such that they will not be picked up by standard operating system processes and services, but still would likely be picked up by an intruder (e.g., network monitor). In some embodiments, these techniques can be particularly useful for packets that are automatically processed by certain components, such as file share discovery modules.

A variety of such formatting/transmission techniques can be used in different embodiments. A few examples of such techniques include, but are not limited to, the following:

Tampering with the checksum of the packet at the MAC layer, such that the checksum is invalid.

Tampering with the checksum of the packet at the IP layer, such that the checksum is invalid.

Tampering with the structure of the message at the application layer, such that the message is not properly formatted according to that application layer's protocol.

Using fake credentials that would be ignored by a recipient.

Sending broadcasted messages that are ignored.

After transmission of such active data tokens 138A, the TMS 106 can detect traffic 140 that is originated by a compromised enterprise device based on the received active data token in a variety of ways as disclosed above with regard to FIG. 1. Additionally, the TMS 106 can obtain log information from other (potentially legitimate) systems within the enterprise, and use this log information to identify scenarios where active data tokens have been used. For example, the TMS 106 can obtain a request log from an enterprise DNS server to, for example, detect the use of a fake domain name that was an active data token 138A. As another example, the TMS 106 can obtain Netflow information to, for example, detect an attempt to use a fake IP address that was transmitted as an active data token 138A. As yet another example, the TMS 106 can obtain an Active Directory log to, for example, detect failed login attempts that utilized fake credentials that were transmitted as an active data token 138A.

Upon detecting traffic that was originated responsive to an active data token (i.e., in an attempt to somehow utilize the active data token), the TMS 106 can generate an alert 148. The alert 148 can include a variety of types of information, as described above, and could include data that identifies the type of active data token involved, the value of the active data token, the method of detection of the traffic, and/or information about the device that attempted to exploit/use the token, such as an IP address, MAC address, etc.

Figure 5:
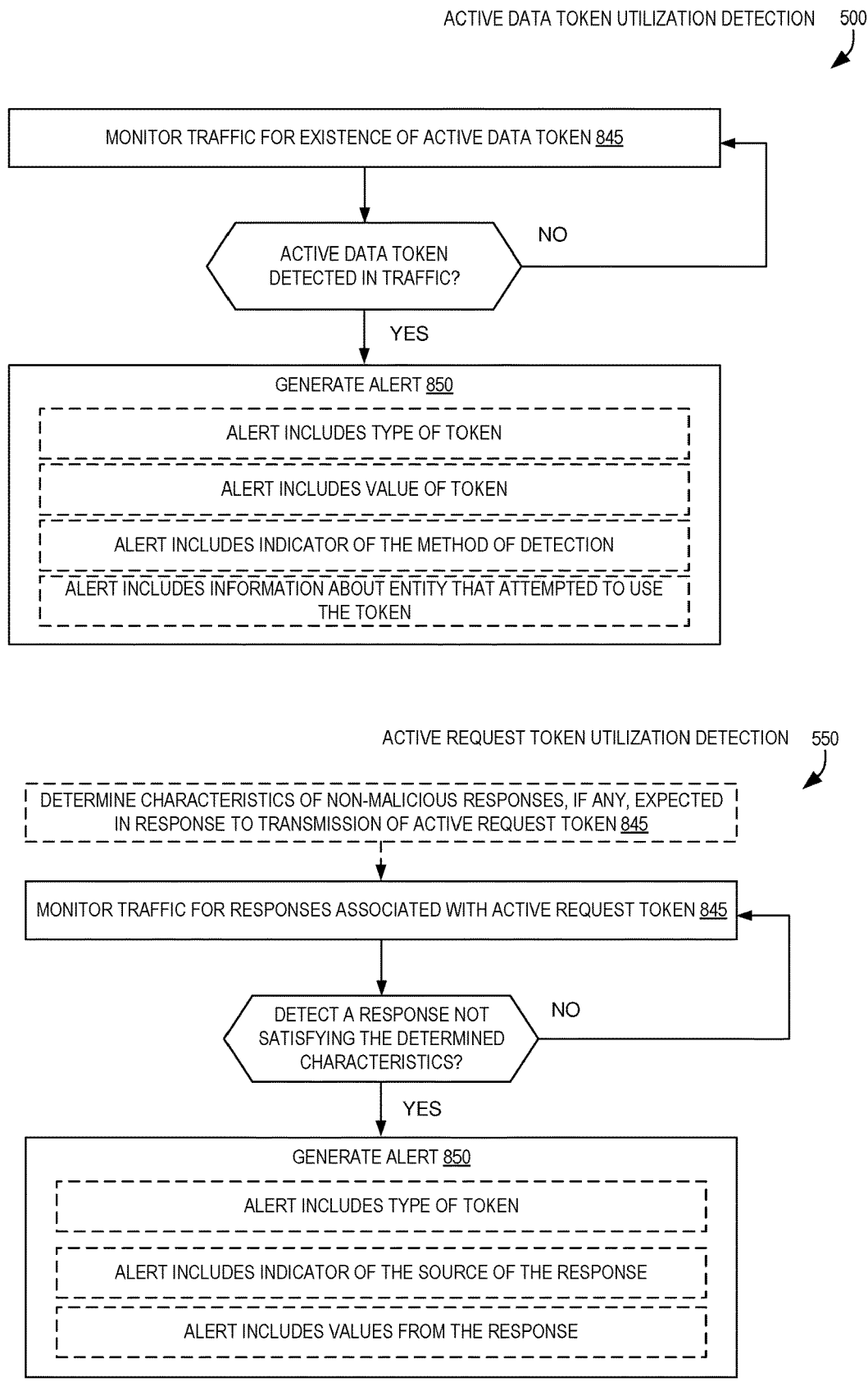
FIG. 5 includes two flow diagrams illustrating a flow for active data token utilization detection and a flow for active request token utilization detection according to some embodiments.

We now turn to FIG. 5, which includes two flow diagrams illustrating a flow 500 for active data token utilization detection and a flow 550 for active request token utilization detection according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments of the invention discussed with reference to these other figures can perform operations different than those discussed with reference to the flow diagrams.

In some embodiments, the operations of flow 500 can be performed by the TMS 106. At block 505, the flow 500 includes monitoring network traffic for the existence of an active data token. At block 510, if an active data token is not detected in the traffic, the flow continues back to block 505. However, if an active data token is detected in the traffic, the flow continues to block 515, where an alert is generated. Optionally, the alert can include one or more of (at block 520) an identifier of the type of the active data token detected, (at block 525) the value of the active data token, (at block 530) an identifier of the method in which the active data token was detected, and/or (at block 535) information about the entity that attempted to use the active data token, such as a source address (e.g., MAC address, IP address), other client identifier, device identifier, etc.

Figure 3:
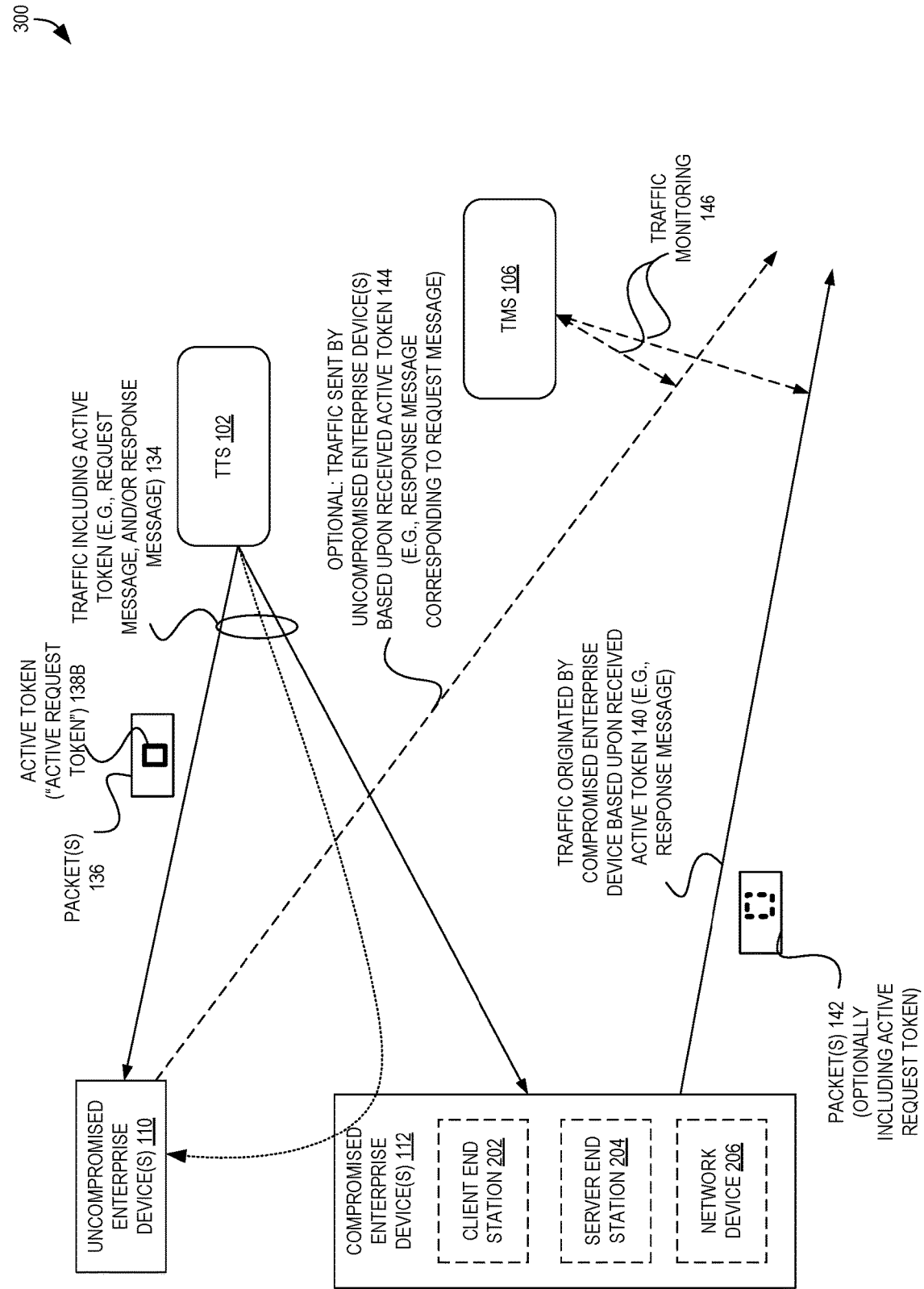
FIG. 3 is block diagram illustrating an active request token and traffic originated by a compromised enterprise device based upon the transmitted active request token according to some embodiments.

In addition to (or as an alternative to) active data tokens, embodiments can utilize active request tokens. FIG. 3 is block diagram 300 illustrating an active request token 138B and traffic 140 originated by a compromised enterprise device based upon the transmitted active request token according to some embodiments.

Thus, the TTS 102 can be configured to generate network packets 136 for protocols that are known to be commonly monitored by intruders, who may look to devise a MITM attack within the network, etc. The traffic (e.g., packets 136) can include request messages of one or more protocols that are used for pulling information about resources. Further, the traffic can also include response packets for those requests.

A few examples of active request tokens will be described next; however, it is to be understood that this listing is merely exemplary and thus, more, fewer, and/or different types of active request tokens can be utilized in different embodiments.

Some embodiments can utilize Link-Local Multicast Name Resolution (LLMNR) requests to carry active request tokens. The LLMNR protocol is often used by components in a Microsoft® environment to perform host name to IP translation. In some embodiments, the TTS 102 can generate LLMNR request messages that try to resolve fake host names (as the active request tokens) that do not exist in the enterprise network.

Some embodiments can utilize NetBIOS requests to carry active request tokens. The NetBIOS protocol is often used by components in a Microsoft® environment to perform host name to IP translation over a Local Area Network (LAN). In some embodiments, the TTS 102 can generate NetBIOS messages that try to resolve fake host names (as the active request tokens) that do not exist in the LAN. For example, Web Proxy Autodiscovery (WPAD) protocol requests can be encapsulated in NetBIOS packets. WPAD is a protocol used by an end station to find a proxy for outbound communications. Some software components on end stations issue WPAD requests by default. In some embodiments, the TTS 102 can generate these requests, and the TMS 106 can be configured to wait for an attacker to respond.

Some embodiments can utilize Simple Service Discovery Protocol (SSDP) Discover requests. SSDP is often used by components to search for services over a network. In some embodiments, the TTS 102 can generate "fake" SSDP discover requests for fake services (as the active request tokens) over the network.

Some embodiments can utilize Web Services Dynamic Discovery (WS-Discovery) requests to carry active request tokens. The WS-Discovery protocol is often used by components in a Microsoft® environment to search for services over the network. In some embodiments, the TTS 102 can generate WS-Discovery requests for fake services (as the active request tokens) that do not exist in the network.

Some embodiments can utilize ARP requests to carry active request tokens. In some embodiments, the TTS 102 can generate ARP requests for fake IP addresses and generate fake responses to those including fake MAC addresses (as the active request tokens). In some embodiments, the TTS 102 can generate ARP requests for actual (i.e., legitimate) IP addresses without generating responses, while the TMS 106 can be configured to identify "invalid" ARP responses that may come from a compromised device (e.g., as part of a MITM attack, etc.).

Some embodiments can utilize DNS queries to carry active request tokens. In some embodiments, the TTS 102 can generate DNS queries for legitimate host names that exist either inside the network or outside the network, together with the TMS 106 being configured to identify "invalid" DNS responses that may come from a compromised device. In some embodiments, the TTS 102 can generate DNS requests for fake host names and generate fake responses to those requests (e.g., carrying "fake" IP addresses as the active request tokens).

Some embodiments can utilize Dynamic Host Configuration Protocol (DHCP) requests to carry active request tokens. DHCP is a protocol used for acquiring initial network configuration data, such as an IP address, default gateway IP address, DNS server address, etc. In some embodiments, the TTS 102 can generate DHCP discovery requests, DHCP requests, DHCP information requests, etc., together with the TMS 106 being configured to identify "invalid" DHCP responses that may come from a compromised device.

In some embodiments, the active request token packets are constructed so that the source information (e.g., a MAC address, IP address) is chosen in such way that it can be monitored by the system. For example, the MAC address and/or IP address could be utilized by a TSS 108, utilized by the TMS 106 itself, or utilized in some other way such that the TMS 106 can gain visibility into any response traffic that may result.

In some embodiments, the TTS 102 is configured to periodically transmit the packets 136 over the local network, and can be configured to communicate the type of the packets and/or the contents of the packets to the TMS 106 (e.g., as token monitoring information 132).

Turning to FIG. 5, we now consider the flow 550 for active request token utilization detection according to some embodiments. In some embodiments, flow 550 is performed by the TMS 106.

The TMS 106 can be configured to monitor 146 network traffic for responses to active request tokens using two phases. First, the TMS 106 can identify the "normal" response to each active request token—i.e., (at optional block 555) determine characteristics of non-malicious responses, if any, expected in response to the transmission of an active request token. In some embodiments, the "normal," non-malicious response could be of the following types:

A response generated by the TTS 102 itself, such as when the TTS 102 generates a request for a fake resource and also generates the response.

A response generated by a legitimate client end station or server end station within the network—see traffic 144. This can occur when the request is for an existing resource (e.g., an ARP request for a legitimate IP address on the network, a DHCP request, etc.) and it is expected that a legitimate entity will response to the request.

No response expected. This can be the case with certain requests for non-existing services (e.g., WPAD requests).

In a second phase, the TMS 106 can compare any received responses to the expected response. Accordingly, at block 560, traffic is monitored for responses associated with (or, responsive to) the active request token. If a response is not detected that doesn't satisfy the determined characteristics (at block 565), the flow 550 continues with block 560. However, if a response is detected that does not satisfy the determined characteristics (at block 565) (e.g., a response arrives when it is not expected, a DNS response for fake resource has a different value than the one expected), then an alert is generated at block 570. Optionally, the alert can include one or more of the type of the involved active request token (block 575), an identifier of the source of the response (block 580), and/or the (attacker-provided) values from the response (block 585) (e.g., the IP address provided as a DNS resolution response).

Figure 4:
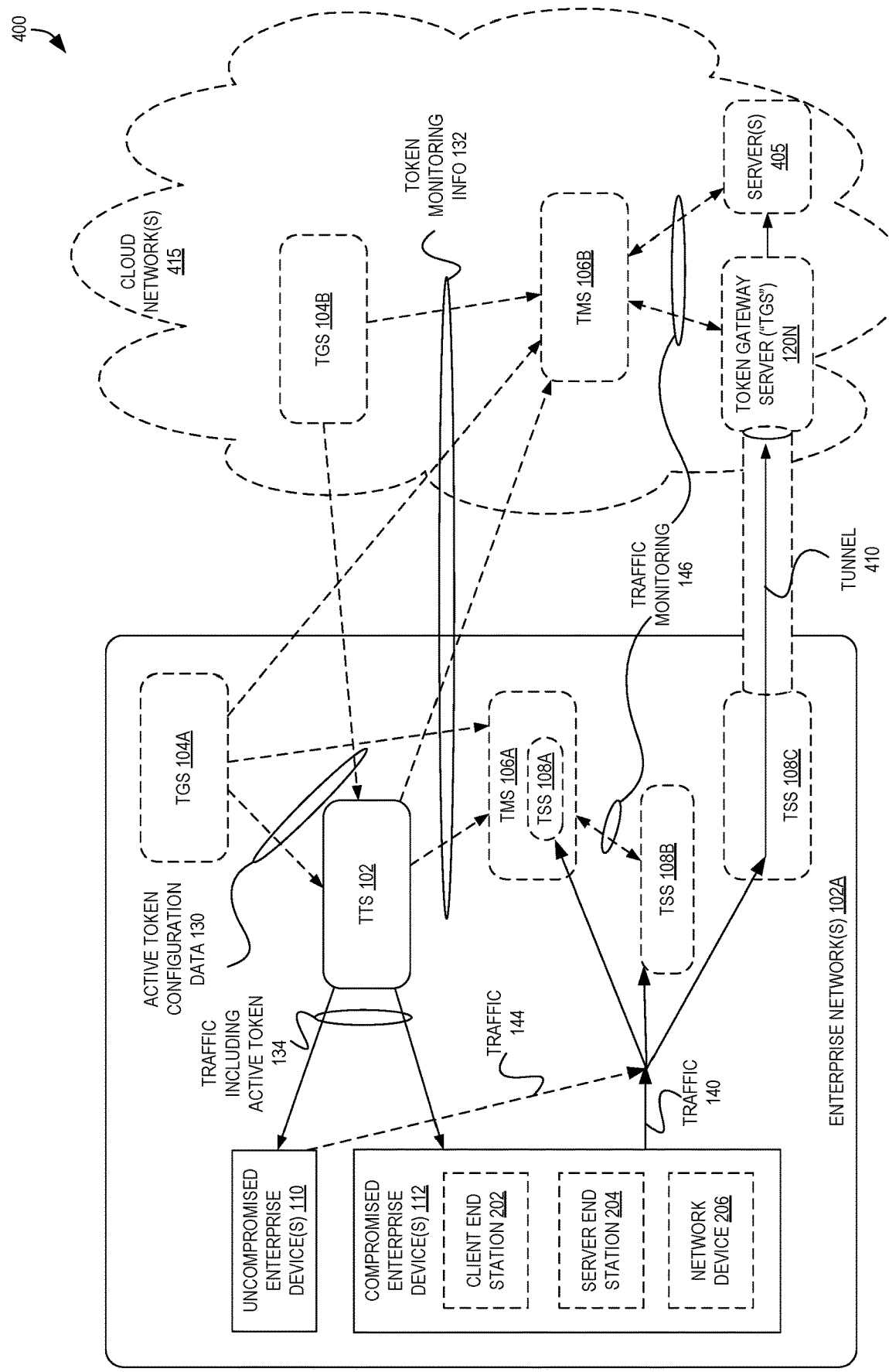
FIG. 4 is block diagram illustrating some placement locations and configurations of servers for detecting enterprise intrusions using active tokens according to some embodiments.

FIG. 4 is block diagram illustrating some placement locations 400 and configurations of servers for detecting enterprise intrusions using active tokens according to some embodiments. As indicated above, the TTS 102 operates within an enterprise network 402 together with one or more uncompromised enterprise devices 110 and the one or more compromised enterprise devices 112. However, many of the other servers can be deployed in a variety of locations in various combinations.

For example, in some embodiments utilizing a TGS 104A, the TGS 104A can be located within the enterprise network 402, but the TGS 104A could also be located remote from the enterprise, such as within a cloud network 415.

As another example, the TMS 106A can be located within the enterprise network 402 (and traffic monitoring 146 can occur with an in-enterprise TSS 108B or with a TSS located as a subcomponent of the TMS 106A (i.e., TSS 108A)), but in some embodiments the TMS can also be located remote from the enterprise (i.e., TMS 106B), such as within a cloud network 415. In such a case, the TMS 106B can connect back to the enterprise network 402 for monitoring purposes.

However, in other embodiments, the TSS 108B can performing monitoring "within" the cloud network(s) 415. In some embodiments, the TSS 108C can be located within the enterprise and send received traffic to the cloud network(s) 415 over a public network such as the Internet to a public network address (e.g., an IPv4 or IPv6 address) of a Tunnel Gateway Server ("TGS") 412. In some embodiments, this traffic can be sent over a tunnel 410 such as an IP security (IPSec) tunnel, Generic Routing Encapsulation (GRE) tunnel, etc., though in other embodiments the traffic 140 may be sent using "plain" TCP/IP or via another non-tunneled set of protocols. Upon receipt of forwarded (or "tunneled") traffic, the TGS 412 in some embodiments can be configured to select (or identify) a server 405 that is to receive the traffic and send the traffic to that server 405, though in other embodiments the traffic is not so forwarded. Thus, the TMS 106B can perform monitoring by interacting with the TGS 412, the server 405, and/or by observing traffic flowing received at the tunnel exit point within the cloud network(s) 415.

Figure 6:
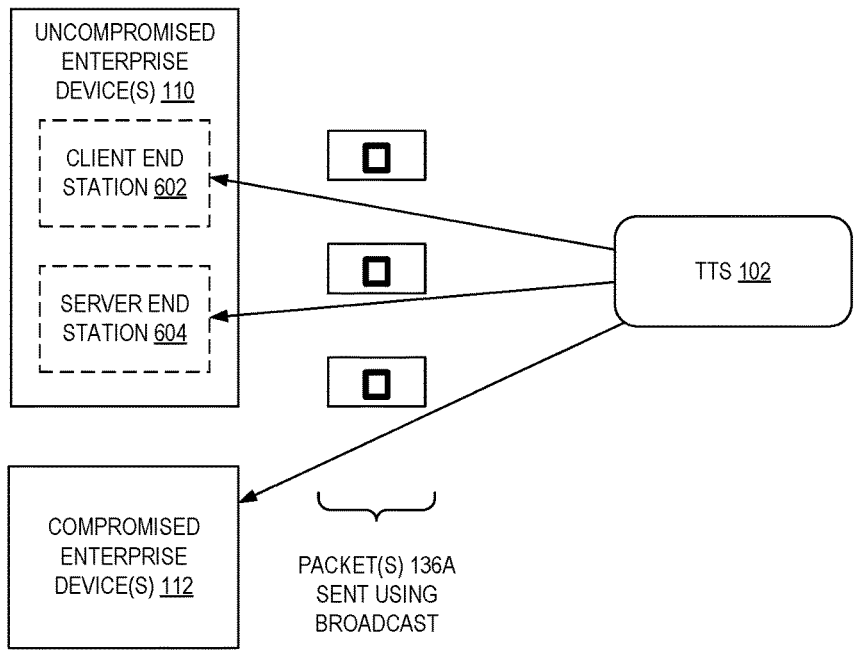
FIG. 6 includes two block diagrams illustrating a broadcast scheme for active token distribution and a modified unicast scheme for active token distribution according to some embodiments.
Figure 6:
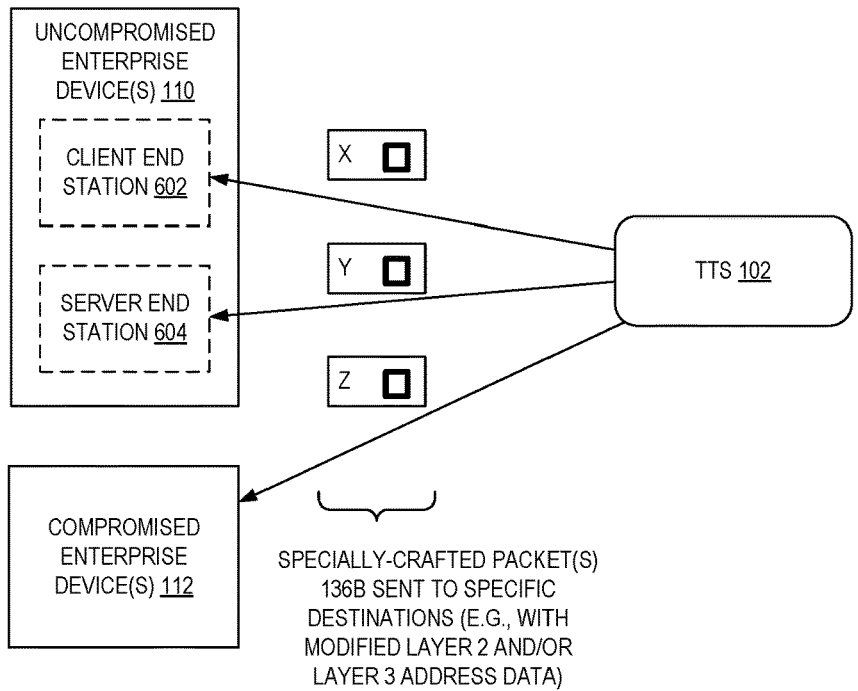

FIG. 6 includes two block diagrams illustrating a broadcast scheme 600 for active token distribution and a modified unicast scheme 650 for active token distribution according to some embodiments.

In a minority of observed attack scenarios, an intruder may compromise or "take over" a network device, such as a managed network switch or a router, giving that intruder visibility to any communication that flows through the network. In many scenarios though, an intruder gains controls over an individual end station, giving that attacker visibility only to the particular traffic that flows to that end station.

As discussed above, some of the tokens represent protocols that are broadcasted by nature, and thus make the packets become visible to an attacker is trivial. Accordingly, the illustrated broadcast scheme 600 shows how packets 136A are naturally "broadcast" to many (or all) end points in a network.

However, some protocols that can be utilized are not of a broadcast nature (e.g., DNS), and some are even session based (e.g., CIFS). For these protocols, it is useful that the packets should be generated in such a way that (a) the packets are delivered to and captured by the network interface in a compromised end point, (b) an intruder would not find it strange to see such packets in the capture. Accordingly, in some embodiments, active tokens are generated and transmitted for protocols that are not broadcast in their nature using a modified unicast scheme 650.

In some embodiments, dedicated packets are generated for each end point (or a selection of end points, such as those associated with just client end stations, etc.) in the network (i.e., those represented by an IP address). In some embodiments, the Layer 3 (i.e., the IP layer) part of the packet can be constructed to look like it either comes from, or is being sent to, a particular IP address. However, the destination MAC address of the packet (in Layer 2) can be set to be the MAC address of the specific machine being targeted, regardless of the direction expressed by Layer 3 addressing, and then sent. Notably, this configuration is purposefully incorrect according to standard practices, as the destination MAC address may not correspond to the destination IP address. However, this mismatch nicely results in traffic being provided to particular end points while keeping the desired IP addresses (which may not at all be associated with the particular recipient) intact, because many enterprises utilize network switches that operate at Layer 2, thus forwarding traffic using the MAC address information without considering the IP (i.e., Layer 3) information contained therein. Thus, in some embodiments, a particular packet can be "re-transmitted" to one or more other destinations by modifying the Layer 2 destination address (e.g., MAC address).

As alluded to herein, different embodiments can provide different benefits (or combinations of benefits). In some embodiments, there is not a limitation upon the number or type of supported protocols involved, as adding support for a new protocol can include performing a simple configuration change of what active tokens are transmitted and monitored.

Moreover, some embodiments have a comparatively minimal on-premise deployment requirement. For example, the TTS 102, TMS 106, etc., can be a simple software package that can be installed on hardware provided by the enterprise, delivered as a virtual machine (VM) to be deployed by the customer on a private cloud, etc.

In some embodiments, the on-premise deployment can provide immediate and quick protection for enterprises that do not have a network monitoring system deployed in their network, and can allow enterprises having only limited network monitoring deployments to gain advanced multi-protocol protection mechanisms while avoiding the need to install and maintain large numbers of new, complex components (such as additional network monitoring systems, additional honeypot servers, etc.) within the enterprise.

Additionally, some embodiments do not require that any honey tokens to actually be installed on client or server end stations, as they can simply be transmitted within the network and responsive traffic watched for. Thus, embodiments are minimally invasive. Further, some embodiments do not require that typical, legitimate enterprise network data is even seen by the TMS 106, as it can continue to flow between the enterprise's devices without interruption, thus preserving privacy and speed for the enterprise.

Client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are computing devices operable to execute applications that, among other functions, can access the content (e.g., enterprise data) and/or services provided by server end stations. In some embodiments, the client end stations execute applications to allow a user to create, delete, view, and/or edit user data files stored locally (i.e., within that client end station).

An enterprise can be a business, organization, group, governmental body, or other collective body. Some users of the client end stations are deemed enterprise users or authorized users, which are those users explicitly or implicitly part of the enterprise or acting under the permission of the enterprise. Authorized users, using client end stations, typically access the content (e.g., enterprise data) and/or services of server end stations from within a same LAN (or enterprise network 402) as the server end stations, or when the client end stations are connected to the LAN through use of virtual private network (VPN) connections to the LAN overlaid on (e.g., tunneled through) the Internet (e.g., via a remote access gateway). In some embodiments, though, one or more of the server end stations may be configured to be directly accessible from outside the LAN.

As detailed above, intrusions into an enterprise network may seek access to enterprise data provided by server end stations implementing internal enterprise servers. Such intrusions may occur through a compromised client end station assigned to one or more authorized users that has been accessed or controlled by an intruder/attacker 114. In some instances, the intruder 114 may have direct, physical access to the client end station, but in other instances, the intruder 114 may be able to connect to the client end station from a separate client end station existing either inside or outside the enterprise network. For example, the intruder 114 may be granted access to the client end station when an authorized user accesses a malicious webpage (via the client end station) causing a malicious program or code (i.e., "malware") to be executed by the client end station. For example, the authorized user, using a web browser of the client end station, may load a web page hosting an "exploit kit" that subjects the client end station to one or more attacks (attempting to install malware) against the web browser or other software that the web browser can invoke, such as a third party document viewer or multimedia player, or may attempt to lure the authorized user into surreptitiously allowing or causing the malware to be installed to the client end station. With access to the compromised client end station, the attacker/intruder 114 may then attempt to access enterprise data of the enterprise using information and/or credentials granted to the client end station or authorized user that is stored on the client end station, or, as described herein, using information learned from network traffic (such as active tokens described herein).

The modules and/or servers described herein, in various embodiments, may be implemented with software, hardware, or a combination of both, and may be implemented in a variety of configurations, including implementing each module/server using a separate electronic device or combining some of the modules/servers on just one electronic device.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an enterprise network to detect a compromise of an enterprise device, comprising:

transmitting, by a first server within the enterprise network that is implemented by one or more electronic devices, one or more request messages of a protocol followed by a first set of one or more packets including one or more active tokens to a plurality of enterprise devices, wherein the one or more request messages of the protocol are messages adhering to the protocol that are used for requesting information and include one or more requests, wherein the first set of one or more packets comprises one or more response messages of the protocol that are generated to appear as responses to the one or more request messages, wherein the one or more response messages of the protocol are messages adhering to the protocol that are used for providing responses to requests for information and include one or more fake values as responses to the one or more requests, wherein the one or more active tokens include the one or more fake values and are invalid from the perspective of the enterprise;

monitoring, by a second server, network traffic of the enterprise, wherein the monitoring includes determining that a second set of one or more packets has been originated by the enterprise device based upon the one or more active tokens having been received by that enterprise device, wherein the enterprise device received the one or more active tokens, including the one or more fake values, based on monitoring network traffic of the enterprise and determining that the one or more fake values included in the one or more response messages are provided as responses to the one or more requests included in the one or more response messages according to the protocol, wherein the enterprise device is one of the plurality of enterprise devices; and generating, by the second server, an alert responsive to said determination, wherein the alert indicates that the enterprise device is compromised.

2. The method of claim 1, wherein each of the one or more active tokens comprises either a network address, a host name, a port, or an account credential.

3. The method of claim 1, further comprising: transmitting, by the first server, a third set of one or more packets including one or more active tokens that are one or more active data tokens, wherein the value of each of the one or more active data tokens is invalid from the perspective of the enterprise.

4. The method of claim 1, further comprising: transmitting, by the first server, a third set of one or more packets including one or more active tokens that are one or more active request tokens;

determining that a fourth set of one or more packets has been originated by another enterprise device responsive to the another enterprise device receiving the third set of packets;

determining that the fourth set of packets have characteristics matching known characteristics of expected responses to the third set of packets;

determining that a fifth set of one or more packets has been originated by yet another enterprise device responsive to the yet another enterprise device receiving the third set of packets; and determining that the fifth set of packets do not have characteristics matching the known characteristics of expected responses to the third set of packets.

5. The method of claim 1, wherein the first set of packets are transmitted throughout the enterprise network using a broadcast scheme.

6. The method of claim 1, wherein the first set of packets are transmitted throughout the enterprise network using a unicast distribution scheme, wherein each of the first set of packets comprises a same set of Layer 3 values, and wherein each of the first set of packets comprises a Layer 2 destination address specific to each of the plurality of enterprise devices.

7. The method of claim 1, wherein the one or more active tokens are not installed on the plurality of enterprise devices.

8. The method of claim 1, wherein the first set of packets are ignored by one or more of the plurality of enterprise devices.

9. The method of claim 1, wherein the enterprise device is compromised by an intruder that monitors network traffic to learn about apparent resources of the enterprise network.

10. The method of claim 9, wherein:

the origination of the second set of packets by the enterprise device occurs subsequent to the enterprise device analyzing the first set of packets, as part of the monitoring of the network traffic, to identify at least one of the one or more active tokens; and the second set of packets are originated due to the intruder attempting to exploit an apparent resource of the enterprise network or gain additional information about the apparent resource.

11. The method of claim 1, wherein the first set of packets comprises an Address Resolution Protocol (ARP) response message, wherein the one or more active tokens comprise a Media Access Control (MAC) address that is illegitimate within the enterprise network.

12. The method of claim 1, wherein the first set of packets comprises a Domain Name Server (DNS) response message, wherein the one or more active tokens comprise an Internet Protocol (IP) address that is illegitimate within the enterprise network.

13. The method of claim 3, wherein the third set of packets comprises at least one of:

a Server Message Block (SMB) Mailslot Announcement message, wherein the one or more active tokens included in the third set of packets comprise an identifier of an illegitimate service within the enterprise network;

a Simple Service Discovery Protocol (SSDP) Notify message, wherein the one or more active tokens included in the third set of packets comprise an identifier of an illegitimate service within the enterprise network;

a Link Layer Discovery Protocol (LLDP) Advertisement message, wherein the one or more active tokens included in the third set of packets comprise at least one of an illegitimate hardware address, an illegitimate network address, an illegitimate system name, or an illegitimate system description;

a Windows Internet Name Service (WINS) protocol announcement message, wherein the one or more active tokens included in the third set of packets comprise an identifier of an illegitimate device or server within the enterprise network; or a Common Internet File System (CIFS) message, wherein the one or more active tokens included in the third set of packets comprise at least a username or password that is illegitimate within the enterprise network.

14. The method of claim 1, wherein each of the first set of packets includes at least one of:
an invalid Media Access Control (MAC) layer checksum;
an invalid Internet Protocol (IP) layer checksum; or
an invalid application layer value that does not adhere to a protocol of that application layer.

15. The method of claim 1, further comprising:
causing a token sink server (TSS) to be implemented within the enterprise network to act as a recipient of traffic generated by the plurality of enterprise devices responsive to receipt of packets including active tokens,
wherein the TSS utilizes at least one of a network address, a hardware address, or a port number that is one of the one or more active tokens, and
wherein the TSS is not a legitimate server of the enterprise.

16. One or more non-transitory computer readable storage media having instructions which, when executed by one or more processors of one or more devices, cause the one or more devices to implement a first server and a second server to collectively perform operations for detecting a compromise of an enterprise device of an enterprise network, the operations comprising:
transmitting, by the first server within the enterprise network, one or more request messages of a protocol followed by a first set of one or more packets including one or more active tokens to a plurality of enterprise devices, wherein the one or more request messages of the protocol are messages adhering to the protocol that are used for requesting information and include one or more requests, wherein the first set of one or more packets comprises one or more response messages of the protocol that are generated to appear as responses to the one or more request messages, wherein the one or more response messages of the protocol are messages adhering to the protocol that are used for providing responses to requests for information and include one or more fake values as responses to the one or more requests, wherein the one or more active tokens include the one or more fake values and are invalid from the perspective of the enterprise, wherein the one or more active tokens are included in the first set of one or more packets to expose the one or more active tokens to potential intruders while the first set of one or more packets is being transmitted over the network;
monitoring, by the second server, network traffic of the enterprise, wherein the monitoring includes determining that a second set of one or more packets has been originated by the enterprise device based upon the one or more active tokens having been received by that enterprise device, wherein the enterprise device received the one or more active tokens, including the one or more fake values, based on monitoring network traffic of the enterprise and determining that the one or more fake values included in the one or more response messages are provided as responses to the one or more requests included in the one or more response messages according to the protocol, wherein the enterprise device is one of the plurality of enterprise devices; and
generating, by the second server, an alert responsive to said determination, wherein the alert indicates that the enterprise device is compromised.

17. The one or more non-transitory computer readable storage media of claim 16, wherein each of the one or more active tokens comprises either a network address, a host name, a port, or an account credential.

18. The one or more non-transitory computer readable storage media of claim 16, wherein the operations further comprise transmitting, by the first server, a third set of one or more packets including one or more active tokens that are one or more active data tokens, wherein the value of each of the one or more active data tokens is invalid from the perspective of the enterprise.

19. The one or more non-transitory computer readable storage media of claim 16, wherein the operations further comprise: transmitting, by the first server, a third set of one or more packets including one or more active tokens that are one or more active request tokens;
determining that a fourth set of one or more packets has been originated by another enterprise device responsive to the another enterprise device receiving the third set of packets;
determining that the fourth set of packets have characteristics matching known characteristics of expected responses to the third set of packets;
determining that a fifth set of one or more packets has been originated by yet another enterprise device responsive to the yet another enterprise device receiving the third set of packets; and
determining that the fifth set of packets do not have characteristics matching the known characteristics of expected responses to the third set of packets.

20. The one or more non-transitory computer readable storage media of claim 16, wherein the first set of packets are transmitted throughout the enterprise network using a broadcast scheme.

21. The one or more non-transitory computer readable storage media of claim 16, wherein the first set of packets are transmitted throughout the enterprise network using a unicast distribution scheme, wherein each of the first set of packets comprises a same set of Layer 3 values, and wherein each of the first set of packets comprises a Layer 2 destination address specific to each of the plurality of enterprise devices.

22. The one or more non-transitory computer readable storage media of claim 16, wherein the one or more active tokens are not installed on the plurality of enterprise devices.

23. The one or more non-transitory computer readable storage media of claim 16, wherein the first set of packets are ignored by one or more of the plurality of enterprise devices.

24. The one or more non-transitory computer readable storage media of claim 16, wherein the enterprise device is compromised by an intruder that monitors network traffic to learn about apparent resources of the enterprise network.

25. The one or more non-transitory computer readable storage media of claim 24, wherein:
the origination of the second set of packets by the enterprise device occurs subsequent to the enterprise device analyzing the first set of packets, as part of the monitoring of the network traffic, to identify at least one of the one or more active tokens; and
the second set of packets are originated due to the intruder attempting to exploit an apparent resource of the enterprise network or gain additional information about the apparent resource.

26. The one or more non-transitory computer readable storage media of claim 16, wherein the first set of packets comprises an Address Resolution Protocol (ARP) response message, wherein the one or more active tokens comprise a Media Access Control (MAC) address that is illegitimate within the enterprise network.

27. The one or more non-transitory computer readable storage media of claim 16, wherein the first set of packets comprises a Domain Name Server (DNS) response message, wherein the one or more active tokens comprise a Internet Protocol (IP) address that is illegitimate within the enterprise network.

28. The one or more non-transitory computer readable storage media of claim 18, wherein the third set of packets comprises at least one of:
- a Server Message Block (SMB) Mailslot Announcement message, wherein the one or more active tokens included in the third set of packets comprise an identifier of an illegitimate service within the enterprise network;
- a Simple Service Discovery Protocol (SSDP) Notify message, wherein the one or more active tokens included in the third set of packets comprise an identifier of an illegitimate service within the enterprise network;
- a Link Layer Discovery Protocol (LLDP) Advertisement message, wherein the one or more active tokens included in the third set of packets comprise at least one of an illegitimate hardware address, an illegitimate network address, an illegitimate system name, or an illegitimate system description;
- a Windows Internet Name Service (WINS) protocol announcement message, wherein the one or more active tokens included in the third set of packets comprise an identifier of an illegitimate device or server within the enterprise network; or
- a Common Internet File System (CIFS) message, wherein the one or more active tokens included in the third set of packets comprise at least a username or password that is illegitimate within the enterprise network.

29. The one or more non-transitory computer readable storage media of claim 16, wherein each of the first set of packets includes at least one of:
- an invalid Media Access Control (MAC) layer checksum;
- an invalid Internet Protocol (IP) layer checksum; or
- an invalid application layer value that does not adhere to a protocol of that application layer.

30. The one or more non-transitory computer readable storage media of claim 16, wherein the instructions further cause the one or more devices to implement a token sink server (TSS) within the enterprise network to act as a recipient of traffic generated by the plurality of enterprise devices responsive to receipt of packets including active tokens, wherein the TSS utilizes at least one of a network address, a hardware address, or a port number that is one of the one or more active tokens, and wherein the TSS is not a legitimate server of the enterprise.

* * * * *